(12) United States Patent
Sergison (10) Patent No.: US 11,708,937 B2
(45) Date of Patent: Jul. 25, 2023

(54) METHOD AND APPARATUS FOR GANTRY SYSTEM MOBILITY

(71) Applicant: Caterpillar Inc., Peoria, IL (US)

(72) Inventor: Daniel Peter Sergison, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 95 days.

(21) Appl. No.: 17/192,694

(22) Filed: Mar. 4, 2021

(65) Prior Publication Data
US 2022/0282827 A1    Sep. 8, 2022

(51) Int. Cl.
| F16M 11/00 | (2006.01) |
|---|---|
| F16M 11/42 | (2006.01) |
| B33Y 30/00 | (2015.01) |
| B28B 1/00 | (2006.01) |

(Continued)

(52) U.S. Cl.
CPC .......... F16M 11/425 (2013.01); B28B 1/001 (2013.01); B33Y 30/00 (2014.12); F16M 11/2085 (2013.01); F16M 13/022 (2013.01); F16M 2200/068 (2013.01)

(58) Field of Classification Search
CPC ............. F16M 11/425; F16M 11/2085; F16M 13/022; F16M 2200/068; B28B 1/001; B33Y 30/00; B33Y 10/00; B29C 64/106; B29C 64/20; B29C 64/227; B62B 5/0086; E04G 21/04
See application file for complete search history.

(56) References Cited

U.S. PATENT DOCUMENTS

| 4,266,904 A * | 5/1981 | Fadness ................. B66C 1/101 |
| | | 212/319 |
| 7,814,937 B2 | 10/2010 | Khoshnevis |

(Continued)

FOREIGN PATENT DOCUMENTS

| AT | A83089 B | 8/1992 |
| CN | 109986677 A | 7/2019 |

(Continued)

OTHER PUBLICATIONS

Marine Corps Systems Command—3D-Printed Concrete Barracks Robotic Construction Research, Apr. 10, 2018, retrived from <https://www.youtube.com/watch?v=9S1kxvpgFCk> on Mar. 4, 2021.

(Continued)

*Primary Examiner* — Amy J. Sterling
(74) *Attorney, Agent, or Firm* — Lee & Hayes, PLLC (57) ABSTRACT

An assembly includes an attachment arm having an axle extending from a first end of the attachment arm. The attachment arm of the detachable wheel assembly further includes a securing portion forming a second end of the attachment arm, the securing portion of the attachment arm including a pin positioned to extend above a first frame member of a gantry truss and to secure the first frame member between the pin and a portion of the attachment arm. The attachment arm also includes a frame support corresponding to a second frame member of the gantry truss such that the frame support supports the second frame member when the assembly is secured to the gantry truss, and the assembly includes a wheel rotatably attached to the axle of the attachment arm.

9 Claims, 5 Drawing Sheets

(51) Int. Cl.
*F16M 11/20* (2006.01)
*F16M 13/02* (2006.01)

(56) References Cited

U.S. PATENT DOCUMENTS

| | | | |
|---|---|---|---|
| 8,029,710 B2* | 10/2011 | Khoshnevis | B23Q 11/0014 |
| | | | 212/312 |
| 10,061,323 B2* | 8/2018 | Muck | G05D 1/0248 |
| 10,074,449 B2 | 9/2018 | White et al. | |
| 10,597,264 B1* | 3/2020 | Muck | B66C 19/00 |
| 2009/0127348 A1 | 5/2009 | Schroeder | |
| 2014/0076192 A1 | 3/2014 | Hurd | |
| 2015/0084297 A1 | 3/2015 | Chouinard | |
| 2017/0151704 A1 | 6/2017 | Go et al. | |
| 2018/0056544 A1 | 3/2018 | Kreiger et al. | |
| 2018/0086008 A1* | 3/2018 | Northrup | B28B 1/001 |
| 2018/0147782 A1 | 5/2018 | Kobayashi et al. | |
| 2018/0147786 A1 | 5/2018 | Hakkaku et al. | |
| 2018/0169944 A1 | 6/2018 | Hofmann et al. | |
| 2019/0329279 A1 | 10/2019 | Haustein et al. | |
| 2020/0040566 A1 | 2/2020 | Park | |
| 2020/0282593 A1* | 9/2020 | Le Roux | E04G 21/04 |
| 2020/0284025 A1* | 9/2020 | Le Roux | B28B 1/001 |
| 2022/0032500 A1 | 2/2022 | Bramberger et al. | |

FOREIGN PATENT DOCUMENTS

| | | |
|---|---|---|
| CN | 111706083 A | 9/2020 |
| DE | 202016100791 U1 | 5/2017 |
| EP | 0152362 A2 | 8/1985 |
| WO | 2017121912 W | 7/2017 |
| WO | WO2019022771 A1 | 1/2019 |
| WO | 2020180323 A1 | 9/2020 |

OTHER PUBLICATIONS

US military 3D prints concrete barracks on site, Sep. 5, 2018, retrieved from <https://www.dezeen.com/2018/09/05/US-military-3d-prints-concrete-barracks-on-site-technology/> on Mar. 4, 2021.
Written Opinion and International Search Report for Int'l. Patent Appln. No PCT/US2022/018076, dated Jun. 2, 2022 (11 pgs).
Non-Final Office Action dated Dec. 13, 2022 for U.S. Appl. No. 17/192,643 "Gantry Carriage Assembly With Contoured Guide Wheels" Sergison,D. 17 pages.

* cited by examiner

METHOD AND APPARATUS FOR GANTRY SYSTEM MOBILITY

TECHNICAL FIELD

The present disclosure relates to a method and apparatus that provides mobility for a three-dimensional additive gantry system. More specifically, the present disclosure relates to a detachable wheel assembly that is securable to a gantry truss of a three-dimensional additive gantry system such that the gantry system is movable on the wheel assembly.

BACKGROUND

Three-dimensional ("3D") additive systems are used in a variety of applications to form various types of parts, systems, or structures. 3D additive systems and processes enable creation of parts that can be lighter, stronger, or more complex than parts formed by traditional manufacturing processes. Furthermore, 3D additive systems can form parts in a more continuous manner than traditional manufacturing processes.

As products formed by the 3D additive system increase in size, the 3D additive systems used to form such products can also increase in size. For example, 3D additive systems have been used to fabricate buildings or other structures and/or structural components. Such 3D additive systems require support structures to which 3D additive components can be secured and on which the 3D additive components are moveable during a 3D additive manufacturing process.

An example 3D additive construction system is described in U.S. Patent Pub. No. 2020/0282593 (hereinafter referred to as the '593 reference). In particular, the '593 reference describes a construction system that can utilize additive manufacturing processes to produce 3D additive products or structures. The '593 reference describes a construction system that is moved to and from a construction site via a truck-pulled trailer. For example, the '593 reference describes loading and unloading the construction system to and from a flatbed trailer by rolling the construction system on rollers that engage with ramps that extend from the trailer to the construction site. However, such rollers require loading and offloading the construction system on or off a trailer to move the construction system. The '593 reference further describes an additional caster wheel that can be included on a support assembly of the construction system. Such a caster wheel allows the construction system to be moved on a foundation, warehouse floor, or trailer bed. However, the caster wheel requires the use of tools to attach or detach the caster wheel to or from the construction system. Furthermore, a caster wheel does not provide rugged mobility for the construction system if the construction system is used on an uneven or undeveloped surface (e.g., dirt, gravel, rock, grass, etc.). As such, the mobility system (e.g., the rollers and the caster wheels) described in the '593 reference are not easily attached or removed and provide poor mobility solutions when implement on uneven or undeveloped surfaces.

Example embodiments of the present disclosure are directed toward overcoming the deficiencies described above.

SUMMARY

An example assembly includes an attachment arm having an axle extending from a first end of the attachment arm. The attachment arm of the detachable wheel assembly further includes a securing portion forming a second end of the attachment arm, the securing portion of the attachment arm including a pin positioned to extend above a first frame member of a gantry truss and to secure the first frame member between the pin and a portion of the attachment arm. The attachment arm also includes a frame support corresponding to a second frame member of the gantry truss such that the frame support supports the second frame member when the assembly is secured to the gantry truss, and the assembly includes a wheel rotatably attached to the axle of the attachment arm.

An additive manufacturing system includes a gantry frame assembly including a gantry truss and a gantry bridge assembly including a trolley movable along a lateral truss of the gantry bridge assembly. The system further includes a gantry carriage assembly movably secured to the gantry frame assembly and configured to support at least a portion of the gantry bridge assembly and a wheel assembly removably attachable to the gantry truss. The wheel assembly includes an axle forming a first end of the wheel assembly, a wheel rotatably attached to the axle, a securing portion forming a second end of the wheel assembly, the securing portion including a pin configured to secure a first frame member of the gantry truss between the pin and a portion of the wheel assembly, and a frame support mating with a second frame member of the gantry truss such that the frame support supports the second frame member of the gantry truss when the wheel assembly is removably attached to the gantry truss.

In a further example, a method of includes adjusting one or more jacks to raise a gantry frame assembly of a gantry system, wherein the one or more jacks are attached to at least one gantry truss of the gantry frame assembly. The method further includes coupling a wheel assembly to the at least one gantry truss at a location along the gantry frame assembly at a balance point of the gantry system and moving the gantry system from a first location on a support surface to a second location on the support surface spaced from the first location by rolling the gantry system on the wheel assemblies.

DETAILED DESCRIPTION

This disclosure generally relates to a three-dimensional ("3D") additive system (referred to herein as "the system"). The system described herein is used to construct various types of structures, portions of structure(s), or other products utilizing additive manufacturing processes. Such additive manufacturing processes may enable construction of structures and/or portions thereof more economically and/or quicker when compared with traditional construction processes of like structures and/or portions thereof. Typically, additive manufacturing processes deposit an extrudable building material in vertically stacked layers to form the structure and/or portions thereof. As such, the system requires a support structure that is capable of supporting a gantry bridge that moves along the support structure during an additive manufacturing process. In implementations, the support structure facilitates relatively free movement of a supply hose, e.g., in x-, y-, and z-directions, to accomplish the construction.

Figure 1:
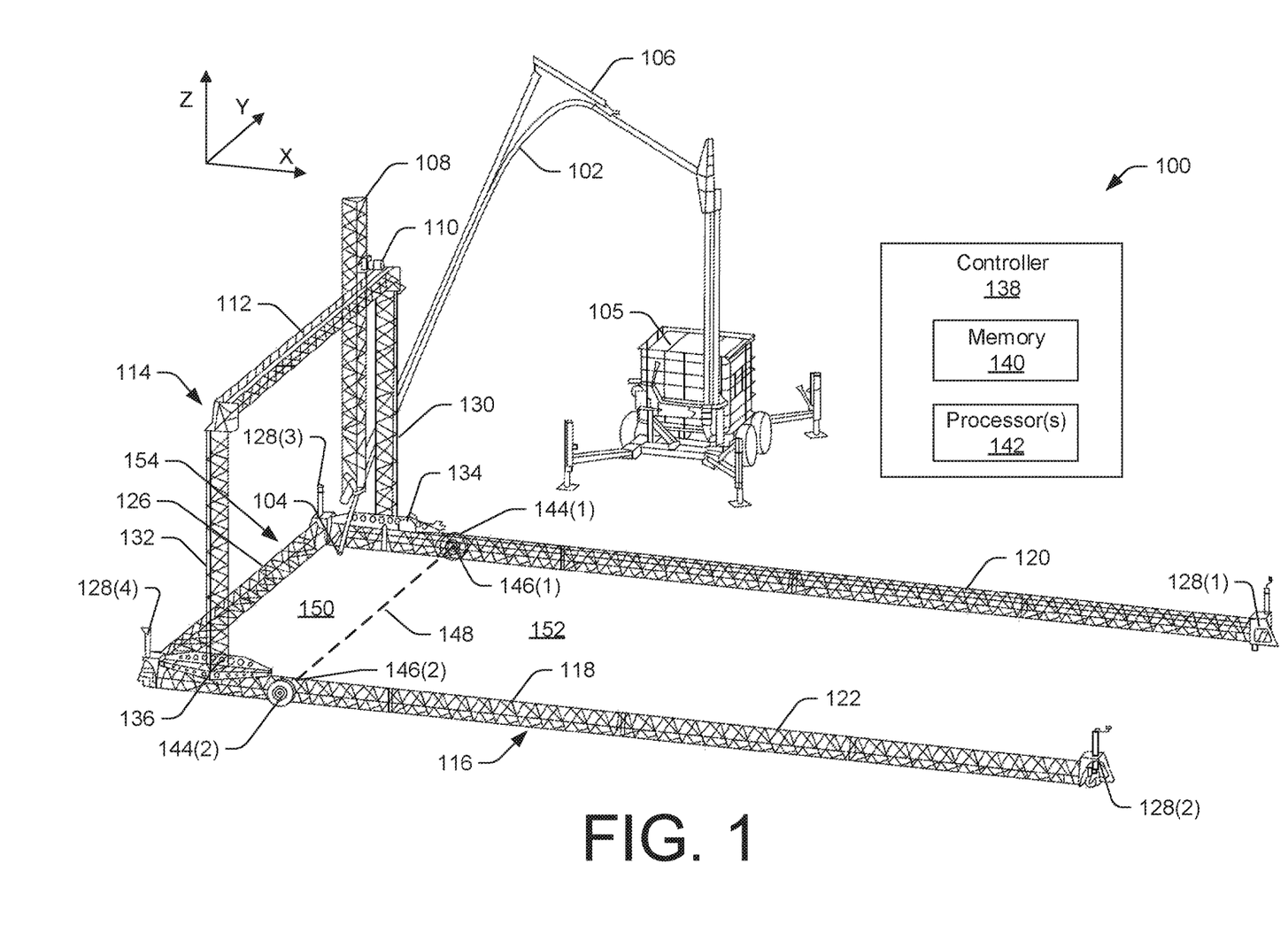
FIG. 1 is a perspective view of an example three-dimensional additive system in accordance with an example of the present disclosure.

FIG. 1 depicts a perspective view of an example 3D additive system 100 (referred to herein as "the system 100"). As mentioned previously, the system 100 is used to construct various types of structures, portions of structure(s), or other products utilizing an additive manufacturing process. For example, in an additive manufacturing process, an extrudable material is conveyed through a conduit 102 to be deposited, delivered, or otherwise conveyed in a desired location. The conduit 102 guides deposition of the extrudable material such that the extrudable material is vertically stacked in layers to form the structure and/or portions thereof. In some examples, the conduit 102 includes hoses, pipes, or other types of conduit that are configured to convey the extrudable material (or components thereof) from a source to the desired deposition location to a desired deposition site (e.g., a construction site). Furthermore, the conduit 102 includes a nozzle 104 located at an end of the conduit 102. The nozzle 104 may be configured to at least partially control a flow rate of the extrudable material during an additive manufacturing process.

The source (not shown) of the extrudable material includes a mixer, hopper, tank, vessel, etc. that is configured to prepare, store, and/or contain a volume of extrudable material. Furthermore, the system 100 includes one or more water containers 103. The water containers 105 store a volume of water (and/or other liquid) that may be used during an additive manufacturing process. In some examples, water may be added to the extrudable material while the extrudable material is pumped during the additive manufacturing process. Additionally, and/or alternatively, water (and/or other liquid) from the water containers 103 may be mixed with a raw material (e.g. cement) to form the extrudable material and the extrudable material is then pumped through the conduit 102 and deposited. In some examples, the extrudable material may comprise a cement mixture. Additionally, and/or alternatively, the extrudable material may include other types of extrudable materials that may be used in an additive manufacturing process to form a structure and/or portions thereof.

As shown in FIG. 1, the conduit 102 may be attached to a boom 106 that is configured to convey the conduit 102 such that the conduit 102 avoids contact with portions of structure that has previously been extruded (or otherwise formed). For example, the boom 106 may facilitate movement of the conduit 102 in a vertical and/or horizontal direction such that the nozzle 104 of the conduit 102 may be positioned in a desired location for depositing the extrudable material, while the remainder of the conduit 102 avoids contact with obstacles (such as portions of a structure or other product that was previously formed). The boom 106 of the system 100 is adjustable in various directions to allow the nozzle 104 of the conduit 102 to be positioned in any location within the system 100. Additionally, the boom 106 may allow the conduit 102 and nozzle 104 to be positioned outside of the system 100 in order to clean, repair, and/or replace the conduit 102 and/or the nozzle 104.

In some examples, a portion of the conduit 102 that is proximate the nozzle 104 is secured to an end of a gantry truss 108. The gantry truss 108 extends in a substantially vertical direction (e.g., the z-direction in FIG. 1) and may be secured by or coupled to a trolley 110. The trolley 110 is configured to adjust a position of the gantry truss 108, thereby positioning the conduit 102 and nozzle 104 in a desired location. For example, the trolley 110 includes guide wheels and one or more motors that are configured to move the gantry truss 108 in one or more directions sequentially or simultaneously. For example, the trolley 110 is configured to adjust a position of the gantry truss 108 in a vertical direction (e.g., a direction along the Z-axis illustrated in FIG. 1). As a vertical position of the gantry truss 108 is adjusted by the trolley 110 (via the motor and guide wheels), the position of the conduit 102 and nozzle 104 are also adjusted vertically. Furthermore, the trolley 110 is configured to adjust a position of the gantry truss 108 in a lateral direction (e.g., along the Y-axis illustrated in FIG. 1). For example, the guide wheels and one or more motors are configured to move the trolley 110 along a horizontal truss 112 of a gantry bridge assembly 114 (referred to herein as "the gantry bridge 114"). As the trolley 110 moves along the horizontal truss 112, the gantry truss 108 secured by the trolley 110 is also translated along the X-axis. As such, a position of the conduit 102 and the nozzle 104 is adjusted by the trolley 110 that is secured to and movable along the gantry bridge 114.

The system 100 further includes a gantry frame assembly 116 (referred to herein as "the gantry frame 116"). The gantry frame 116 comprises multiple components coupled to form a generally horizontal, substantially U-shaped frame. More specifically, the gantry frame 116 is illustrated as including gantry trusses 118 that form a first length 120 of the gantry frame 116. In some examples, the first length 120 of the gantry frame 116 may be formed from a single gantry truss 118 or the first length 120 may be formed by multiple gantry trusses 118 that are coupled (e.g., fastened) to each other. The gantry frame 116 further includes gantry trusses 118 that form a second length 122 of the gantry frame 116 spaced from the first length 120. The second length 122 of the gantry frame 116 may be formed by a single gantry truss 118 or the second length 122 may be formed by multiple gantry trusses 118 that are coupled (e.g., fastened) to each other. In some examples, the first length 120 of the gantry frame 116 extends in a direction that is substantially parallel to a direction of extension of the second length 122 of the gantry frame 116. Furthermore, the first length 120 and the second length 122 may be substantially equal such that the first length 120 and the second length 122 are within a predetermined tolerance (e.g., +/−6 inches) of each other.

Furthermore, the first length 120 of the gantry frame 116 is spaced apart from the second length 122 of the gantry frame 116 by a distance that forms a width of the gantry frame 116. For example, the gantry frame 116 includes one or more additional gantry trusses 118 that form a first width 126 of the gantry frame 116. The first width 126 of the gantry frame 116 may be formed by a single of the gantry trusses 118 or multiple gantry trusses 118 that are connected (or fastened) to each other. Furthermore, the first width 126 of the gantry frame 116 is connected to ends of the first length 120 and the second length 122 of the gantry frame 116, thereby connecting the first length 120 and the second length 122 of the gantry frame 116. Accordingly, the gantry frame 116 includes a plurality of the gantry trusses 118 comprising the first length 120, the second length 122 and the first width 126, making the gantry frame 116 substantially U-shaped. As will be appreciated, during operation of the system 100, a building or other structure made using the 3D additive processes described herein may be formed within a footprint of the gantry frame 116.

In some examples, the gantry frame 116 may further include instances of the gantry trusses 118 that form a second width (not shown in FIG. 1) of the gantry frame 116. The second width of the gantry frame 116 is located at an end of the first length 120 and the second length 122 that is opposite the first width 126. When provided, the gantry trusses 118 forming the second width configure the gantry frame 116 as a substantially rectangular frame. In some examples, the first width 126 and/or the second width may be removed once a structure or portion thereof is completed in order to remove the system 100 from a location of the completed structure.

The system 100 may include one or more jacks 128 attached to and located at various locations on the gantry frame 116. The jacks 128 may be adjustable to alter a vertical position of the gantry frame 116. For example, when one or more jacks 128 are adjusted, at least a portion of the gantry frame 116 moves in a direction relative to the Z-axis. In some examples, the jacks 128 may include wheels that contact a surface on which the system 100 rests when the jacks 128 are adjusted, e.g., to extend the wheels past a base of the jacks 128. Thus, a position of the system 100 may be adjusted via the wheels of the jacks 128. The wheels of the jacks 128 are shown and described further with respect to FIG. 2. While FIG. 1 depicts the system 100 as having four jacks (e.g., 128(1), 128(2), 128(3), and 128(4)) located at multiple positions on the gantry frame 116, the system 100 may include more than or fewer than four jacks 128 located at similar or different locations on the gantry frame 116.

In some examples, the horizontal truss 112, the gantry truss 108 secured by the trolley, and the gantry trusses 118 of the gantry frame 116 may include a same or similar type of gantry truss. For example, the horizontal truss 112, the gantry truss 108 secured by the trolley 110 and the gantry trusses 118 may be triangular shaped trusses (or "triangular trusses"). The triangular trusses may include three longitudinal members that are connected via one or more horizontal members, diagonal members, etc. Alternatively, in some examples, the gantry trusses used in the system 100 may include a different shape or configuration. These and other components of the gantry trusses 112, 108, and 118 are shown and described further herein with respect to FIG. 2.

As mentioned previously, the system 100 includes a gantry bridge 114. As shown in FIG. 1, the gantry bridge 114 is at least partially supported by the gantry frame 116. For example, the gantry bridge 114 includes the horizontal truss 112 that spans a distance between and is coupled on opposite ends to a first vertical truss 130 and a second vertical truss 132. In some examples, the first vertical truss 130 is at least partially supported by (and is coupled to) the first length 120 of the gantry frame 116 and the second vertical truss 132 is at least partially supported by (and is coupled to) the second length 122 of the gantry frame 116. For example, the first vertical truss 130 may be attached to a first carriage assembly 134 that is movably secured to the first length 120 of the gantry frame 116. The first carriage assembly 134 may be attached to the first length 120 of the gantry frame 116 via guide wheels that allow the first carriage assembly 134 to be movable along the first length 120 of the gantry frame 116. Similarly, the second vertical truss 132 may be attached to a second carriage assembly 136 that is movably secured to the second length 122 of the gantry frame 116. The second carriage assembly 136 may be attached to the second length 122 of the gantry frame 116 via guide wheels that allow the second carriage assembly 136 to be movable along the second length 122 of the gantry frame 116. The first carriage assembly 134 and the second carriage assembly 136 may include guide wheels that are configured to reduce wear on components of the system 100, mitigate uplift of the carriage assemblies 134 and 136, mitigate potential debris buildup, among other potential benefits.

The system 100 may also include a controller 138 that is configured to control various operations of the system 100. For example, the controller 138 controls motors included in the system 100 that are configured to move various components (e.g., carriage assemblies) of the system 100 during an additive manufacturing process. The controller 138 may also control a pump or pump system (not shown) that is configured to pump the extrudable material through the conduit 102 during the additive manufacturing process. The controller 138 may control these and other functions of the system 100.

In some examples, the controller 138 includes, for example, a microcontroller, memory (e.g., RAM), storage (e.g., EEPROM or Flash) configured to perform the described functions of the controller 138. The controller 138 controls at least a portion of the operations of the system 100 including operation of the motors (which are shown and described further herein below). Instead of, or in addition to, an engine control module (ECM)/engine control unit (ECU) the controller 138 may include a general computer microprocessor configured to execute computer program instructions (e.g., an application) stored in memory 140 to perform the disclosed functions of the controller 138. As mentioned, the controller 138 includes a memory, a secondary storage device, processor(s), and/or any other computing components for running an application. Various other circuits may be associated with controller 138 such as power supply circuitry, signal conditioning circuitry, or solenoid driver circuitry. In some examples, the controller 138 and/or a portion of components of the controller 138 may be located remotely from the system 100 and may be communicatively coupled to the system 100. For example, the controller 138 may include any suitable assembly and/or device that receives and/or transmits signals to other devices. The controller 138 may include one or more processors 142 executes machine readable instructions provided from the memory 140 that enable the functionality of the processors 142 and/or the controller 138

The system 100 further includes one or more wheel assemblies 144 that are attachable to the gantry frame 116. The wheel assemblies 144 may provide mobility to the system 100 such that a position of the system 100 may be adjusted by rolling (or otherwise moving) the system 100 on the wheel assemblies 144 relative to a work surface/support surface on which the system 100 is disposed. Furthermore, the wheel assemblies 144 may allow the system 100 to be moved in any direction along the X-axis or the Y-axis and/or a combination thereof. In some examples, the wheel assemblies 144 may be removable from the system 100. For example, the wheel assemblies 144 may be attached to the system 100 in order to position the system 100 in a desired location (such as a construction site or other location). Once the system 100 is moved into the desired location, the wheel assemblies 144 may be removed. Furthermore, once the wheel assemblies 144 are removed, the jacks 128 may be adjusted to level the system 100 for an additive manufacturing process. Conversely, once an additive manufacturing process (or a portion thereof) is completed, the jacks 128 may be adjusted to raise the gantry frame 116 to a sufficient height in order to attach the wheel assemblies 144 to the gantry frame 116. Once the wheel assemblies 144 are attached, the jacks 128 may be adjusted to lower the gantry frame 116 such that the system 100 rests, at least partially, on the wheel assemblies 144. As such, the system 100 may be balanced and rolled on the wheel assemblies 144 in order to adjust a position of the system 100 and/or to remove the system 100 from a construction site.

In some examples, the wheel assemblies 144 may be attached to the gantry frame 116 at a location that corresponds with balance points 146(1) and 146(2) along the gantry frame 116 of the system 100 (or substantially proximate the balance point). Each balance point 146(1) and 146(2) is defined by a location along the first length 120 and the second length 122 of the gantry frame 116 that is bisected by an axis 148 (shown by dashed line 148 in FIG. 1) extending along the Y-axis such that a weight of the system 100 is equal on either side of the axis 148. That is to say, the axis 148 bisects the gantry frame 116 at balance points 146(1) and 146(2) where the wheel assemblies 144 are attached, respectively, such that a weight of the system 100 on a first side 150 of the axis 148 is equal to a weight of the system 100 on a second side 152 of the axis 148. It should be noted, that the position of the wheel assemblies 144 shown in FIG. 1 may or may not correspond with the balance points 146(1) and 14(2) of the system 100. Furthermore, a location of the balance points 146(1) and 146(2) will vary along the X-axis as the gantry bridge 114 is moved along the X-axis. Furthermore, a location of the balance points 146(1) and 146(2) will vary based on the number of gantry trusses 118 that form the gantry frame 116 and based on the number of gantry trusses 118 that are disposed on either side of the gantry bridge 114 along the gantry frame.

In some examples, the gantry bridge 114 may be positioned proximate an end 154 of the system 100 and the wheel assemblies 144 may be attached to the gantry frame 116 at a location that corresponds with the balance points 146(1) and 146(2) of the system 100 based on the gantry bridge 114 being positioned at an end of the gantry frame 116. By placing the wheel assemblies 144 at a position that corresponds with the balance points 146(1) and 146(2) of the system 100, a position of the system 100 may be adjusted with reduced turning effort when compared to wheels that are placed in other locations of a gantry system. As such, a position of the system 100 may be easily adjusted by one or more users absent use of machinery. Additionally, and/or alternatively, the position of the system 100 may be adjusted using machinery even when the wheel assemblies 144 are attached to the gantry frame 116 at a location that corresponds with the balance points 146(1) and 146(2) of the system 100.

In some examples, the system 100 may include a first wheel assembly 144(1) attached to a gantry truss 118 that forms at least a portion of the first length 120 of the gantry frame 116 and a second wheel assembly 144(2) attached to a gantry truss 118 that forms at least a portion of the second length 122 of the gantry frame 116. In such an example, the first wheel assembly 144(1) and the second wheel assembly 144(2) may be positioned on the first length 120 and the second length 122 of the gantry frame 116 at corresponding locations along the Y-axis. As mentioned previously, such a location may correspond with a balance points 146(1) and 146(2) of the system 100. For example, when attached to the system 100, the first wheel assembly 144(1) and the second wheel assembly 144(2) may raise the gantry frame 116 from a surface on which the first wheel assembly 144(1) and the second wheel assembly 144(2) rest such that the system 100 is movable on the first wheel assembly 144(1) and the second wheel assembly 144(2). It should be noted that the gantry bridge 114 and/or the wheel assemblies 144(1) and 144(2) may be positioned along the gantry frame 116 such that the gantry frame 116 may be balanced on the wheel assemblies 144(1) and 144(2) in order to move the system 100 on the wheels assemblies 144(1) and 144(2). These and other features of the wheel assemblies 144 are shown and described further herein with respect to FIGS. 2-4.

Figure 2:
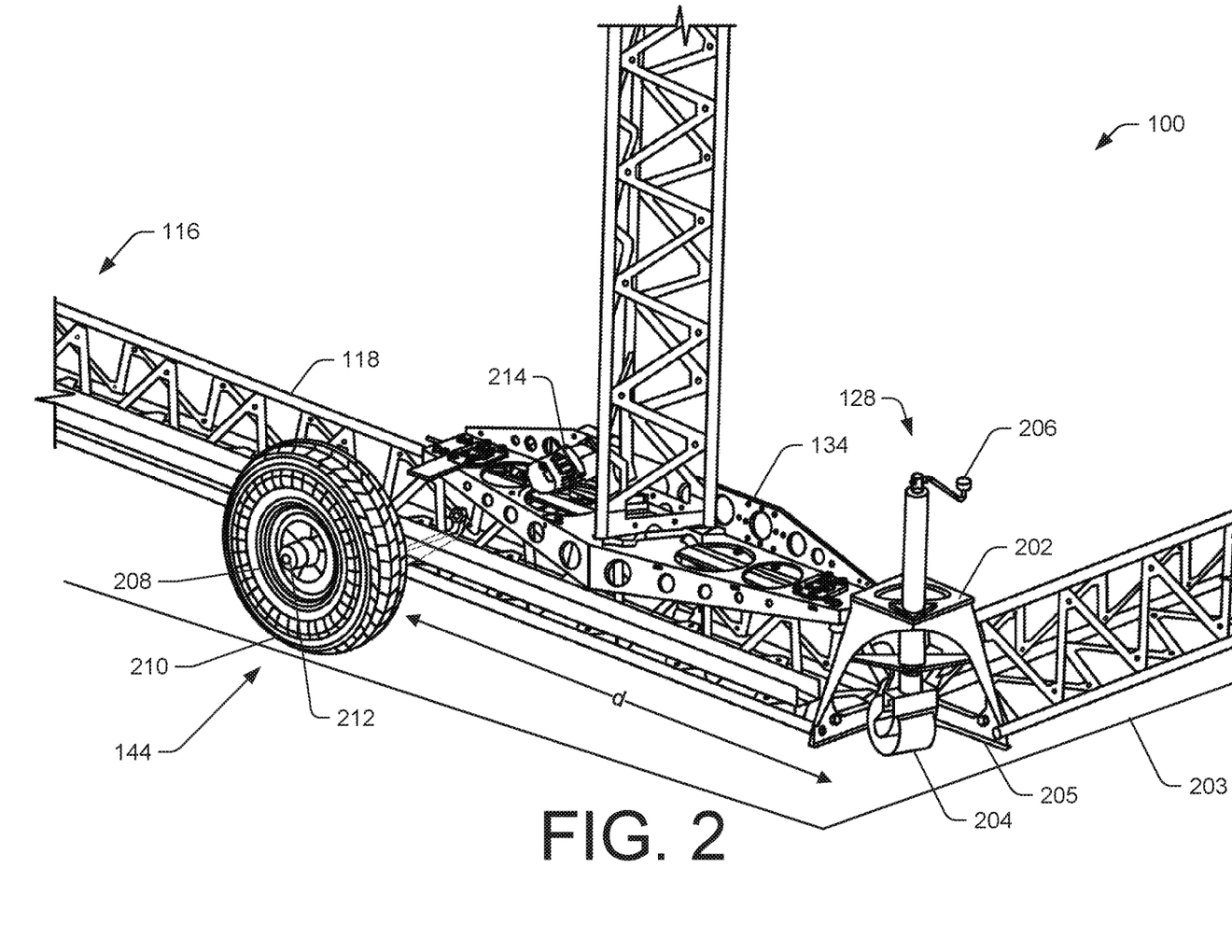
FIG. 2 is a perspective view of an example wheel assembly attached to a three-dimensional additive system in accordance with an example of the present disclosure.

FIG. 2 is a perspective view of the system 100 having a wheel assembly 144 attached to the gantry frame 116 of the system 100. While only the first carriage assembly 134 is shown FIG. 2, it is to be understood that the second carriage assembly 136 may include substantially similar features as the first carriage assembly 136. For ease of explanation, the first carriage assembly 134, as shown and described in FIG. 2, will be referred to as "the carriage assembly 134".

As described previously, the system 100 includes one or more jacks 128 attached to the gantry frame 116. FIG. 2 depicts a single jack of the one or more jacks 128 attached to the gantry frame 116 at an intersection between gantry trusses 118. The jacks 128 include a base frame 202 that may rest on a surface 203 when a wheel 204 of the jacks 128 is retracted such that the wheel 204 does not extend past a bottom 205 of the base frame 202. Alternatively, the jacks 128 may include a foot plate instead of a wheel 204. The wheel 204 of the jacks 128 may include a caster or other type of wheel. Furthermore, the jacks 128 may include a crank 206 that, when rotated, adjusts a vertical position of the wheel 204. In some examples, the jacks 128 may include a threaded shaft that acts against corresponding threads in a housing of the threaded shaft or acts against a plate of the base frame. Additionally, and/or alternatively, the jacks 128 may be pneumatic or hydraulic. By adjusting the vertical position of the wheel 204, a vertical position of the gantry frame 116 may also be adjusted. A such, the gantry frame 116 may be leveled by adjusting one or more jacks 128 at various positions along the gantry frame. Furthermore, when the jack 128 is adjusted such that the wheel 204 extends past the base frame 202, the gantry frame 116 may be raised and may be removed from contacting a surface on which the wheel 204 and/or the gantry frame 116 rests. When all jacks 128 of the system 100 are adjusted such that the wheels 204 extend past the base frame 202, a position of the system 100 may be adjusted. However, when resting on wheels 204 of the jacks 128, adjustments of the position of the system 100 may be relatively minor (e.g., moving the system a few feet).

As mentioned previously, the system 100 also includes wheel assemblies 144 that are attachable to gantry trusses 118 of the gantry frame 116 in order to move the system 100. In some examples, smaller adjustments (e.g., adjustments of a few feet) of a position of the system 100 may be completed using the wheels 204 of the jacks 128. Additionally, larger adjustments (e.g., adjustments more than a few feet and/or moving the system 100 to or from a construction site) may be completed using the wheel assemblies 144. The wheel assemblies may include wheels 208 that are capable of traversing rough terrain (e.g., dirt, gravel, grass, etc.). For example, the wheels 208 of the wheel assemblies 144 may include a tire 210 mounted on the wheels 208. The wheel 208 of the wheel assemblies 144 is rotatably mounted on an axle 212 of the wheel assemblies 144. For example, the wheel 208 may include bearings that allow the wheel 208 to be secured to the axle 212 while being rotatable around the axle 212.

In some examples, a motor 214 may be coupled to the carriage assembly 134. The motor 214 includes an electric motor that communicatively coupled to the controller 128 such that the motor 214 is controlled by the controller 138 of the system 100. For example, the controller 138 sends one or more instructions to the motor 214 that causes the motor to move the carriage assembly 134 along the gantry frame 116. The motor 214 may include wheels, gears, pulleys, other mechanisms that are configured to engage with a drive system of the carriage assembly 136 to move the carriage assembly 134 along the gantry frame 116. In some examples, each carriage assembly (i.e., the first carriage assembly 134 and the second carriage assembly 136) may include a motor 214 that is configured to move the carriage assemblies 134 and 136 along the gantry frame 116.

Figure 3:
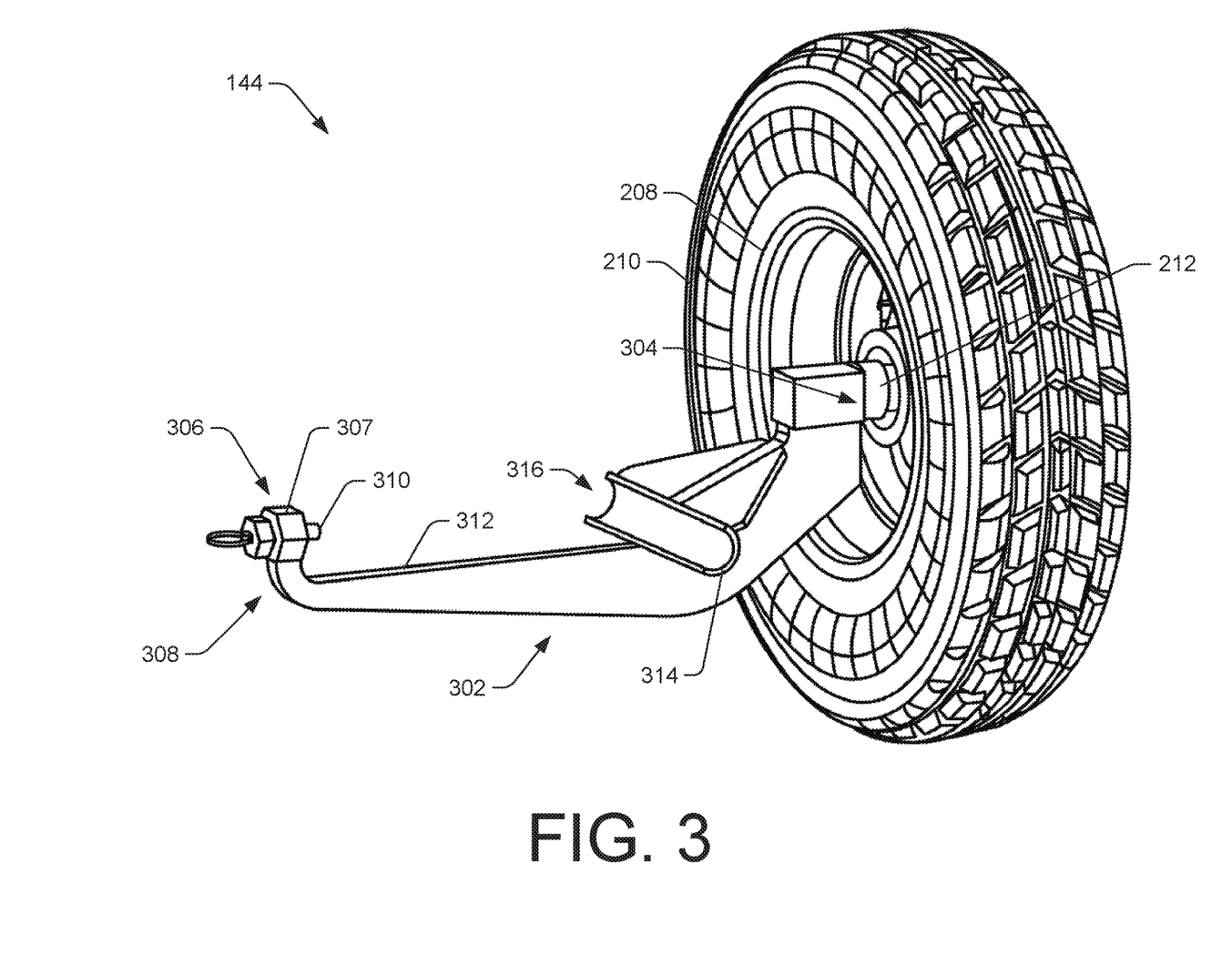
FIG. 3 is a perspective view of an example wheel assembly of a three-dimensional additive system in accordance with an example of the present disclosure.

FIG. 3 is a perspective view of the wheel assembly 144. As shown in FIG. 3, the wheel assembly 144 is removed from the gantry frame 116 of the system 100. The wheel assembly 144 may include an attachment arm 302 to which the wheel 208 is mounted and by which the wheel assembly 144 is mounted to a gantry truss 118 of the gantry frame 116. The attachment arm 302 (and components thereof) may be formed from metal to provide adequate strength to the wheel assembly 144. In some examples, the axles 212 of the wheel assembly 144 extends from a first end 304 of the attachment arm 302. As mentioned previously, the wheel assembly 144 includes a wheel 208 rotatably mounted to the axle 212 of the wheel assembly 144 via bearings or other component allowing the wheel 208 to be secured to and rotate independently of the axle 212.

The wheel assembly 144 further includes a securing portion 306 forming a second end 308 of the attachment arm 302. The securing portion 306 of the attachment arm 302 includes a pin 310 positioned to extend above a frame member of a gantry truss and secure the frame member between the pin 310 and a lateral portion 312 of the attachment arm 302. In some examples, the pin is a spring-loaded pin and may allow the wheel assembly 144 to be attached to the gantry frame 116 without requiring use of tools. In some examples, the securing portion 306 of the attachment arm 302 includes a substantially vertical tab 307 having an aperture therein through which the pin 310 is insertable. The lateral portion 312 (or cradle portion) of the attachment arm 302 extends between the securing portion and a frame support 314 of the attachment arm 302. When the wheel assembly 144 is attached to a gantry truss, the lateral portion 312 of the wheel assembly 144 supports at least a portion of the gantry truss. For example, a frame member of gantry truss may rest on the lateral portion 312 of the wheel assembly 144 such that the lateral portion supports the gantry truss. Furthermore, another frame member of the gantry truss may be supported by the frame support 314 of the attachment arm 302. The frame support 314 may be shaped to correspond with a frame member of the gantry truss such that the frame support 314 supports the frame member when the wheel assembly 144 is secured to the gantry truss. For example, as shown in FIG. 3, the frame support 314 is formed by a partial cylinder having an opening 316 at least partially facing the securing portion 306 of the attachment arm 302. In some examples, the securing portion 306 of the wheel assembly 144 is attached to a frame member of a gantry truss and the wheel assembly 144 is then rotated until another frame member of the gantry truss rests at least partially within the frame support 314.

Figure 4:
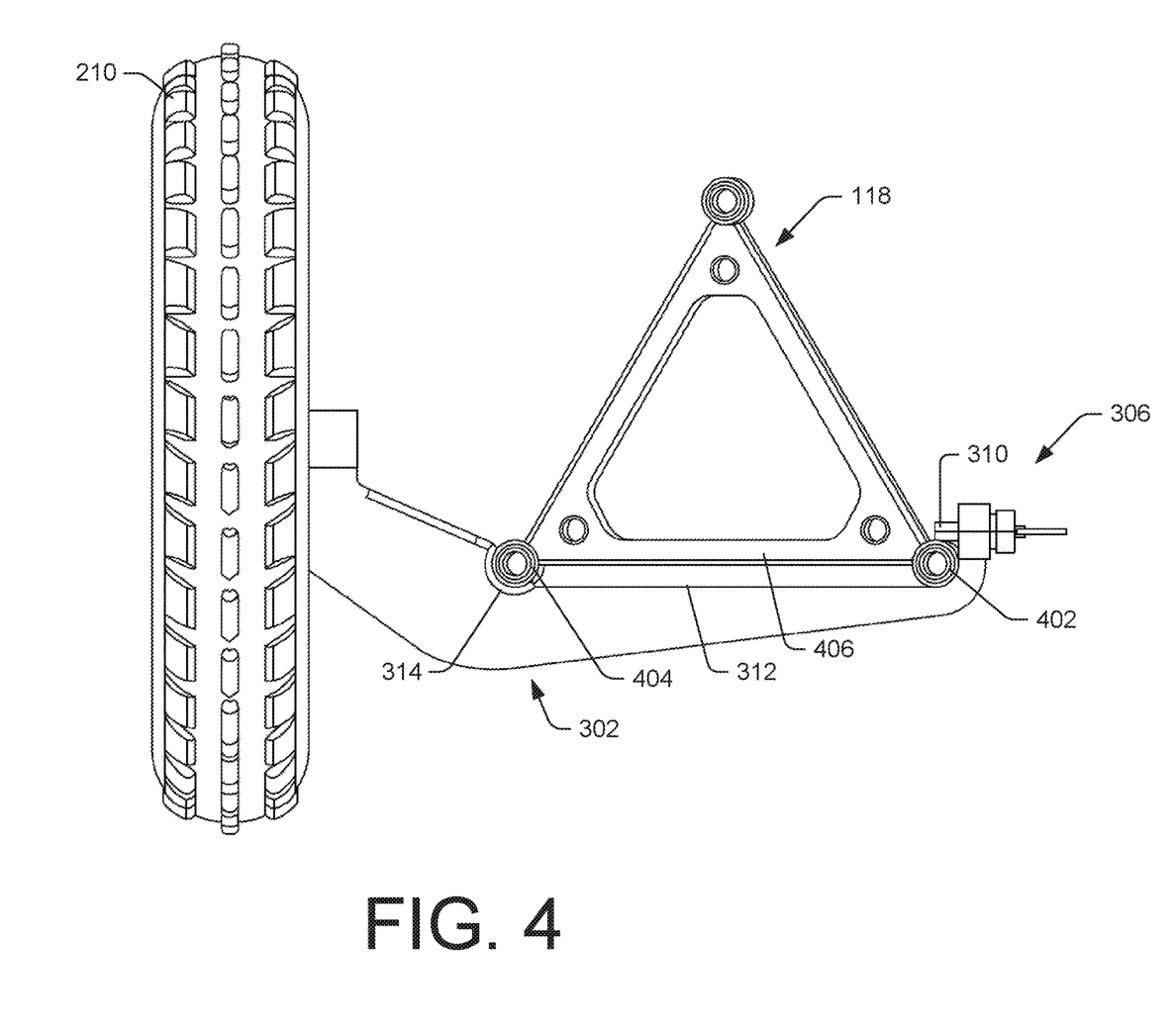
FIG. 4 is a front view of an example wheel assembly secured to a gantry truss of a three-dimensional additive system in accordance with an example of the present disclosure.

FIG. 4 is a front view of the wheel assembly 144 secured to a gantry truss 118 of the gantry frame 116. As described previously, the wheel assembly 144 include a securing portion 306 configured to secure a frame member 402 of the gantry truss 118 between the pin 310 of the securing portion 306 and the lateral portion 312 of the wheel assembly 144. The securing portion 306 may be curved or otherwise shaped to correspond with a shape of the frame member 402. The wheel assembly 144 also includes the frame support 314 that is shaped to correspond with a frame member 404 of the gantry truss 118. The cylindrical shape of the frame support 314 may prevent movement of the frame member 404 once the wheel assembly 144 is secured to the gantry truss 118 and the gantry truss rests at least partially on the attachment arm 302 of the wheel assembly 144. In some examples, the longitudinal members of the gantry truss 118 are connected by helical members 406 of the gantry truss 118. Furthermore, in some examples, the securing portion 306 and the frame support 314 are offset vertically from the axle 212 such that the securing portion 306 and the frame support 314 are located below the axle 212 vertically.

The wheel assemblies 144 described herein may be easily attached to a gantry truss 118 of the gantry frame 116 of the system 100. In some examples, attaching the wheel assembly 144 to the gantry truss 118 may be completed without requiring the use of tools. For example, one or more users adjust one or more of the jacks 128 to raise at least a portion of the gantry frame 116 of the surface 203. The wheel assemblies 144 are then coupled to the gantry truss 118 by clamping a frame member 402 of the gantry truss 118 between the pin 310 and the lateral portion 312 of the wheel assembly 144. Meanwhile, another frame member 404 of the gantry truss 118 rests on and is supported by the frame support 314 of the wheel assembly 144. The wheel assemblies 144 may be positioned along the gantry frame 116 at balance points 146(1) and 146(2) such that a weight of the system 100 is equal across an axis 148 that bisects the gantry frame 116. The wheel assemblies 144 and the location of the wheel assemblies 144 on the gantry frame 116 allow the system 100 to be easily moved around a construction site. Furthermore, by placing the wheel assemblies 144 at the respective balance points 146(1) and 146(2), the system 100 is able to be lifted and rolled by one or more users. For example, a force required to lift and roll the system 100 on the wheel assemblies 144 located at the balance points 146(1) and 146(2) may be within a limit for human ergonomics and/or safety requirements.

Figure 5:
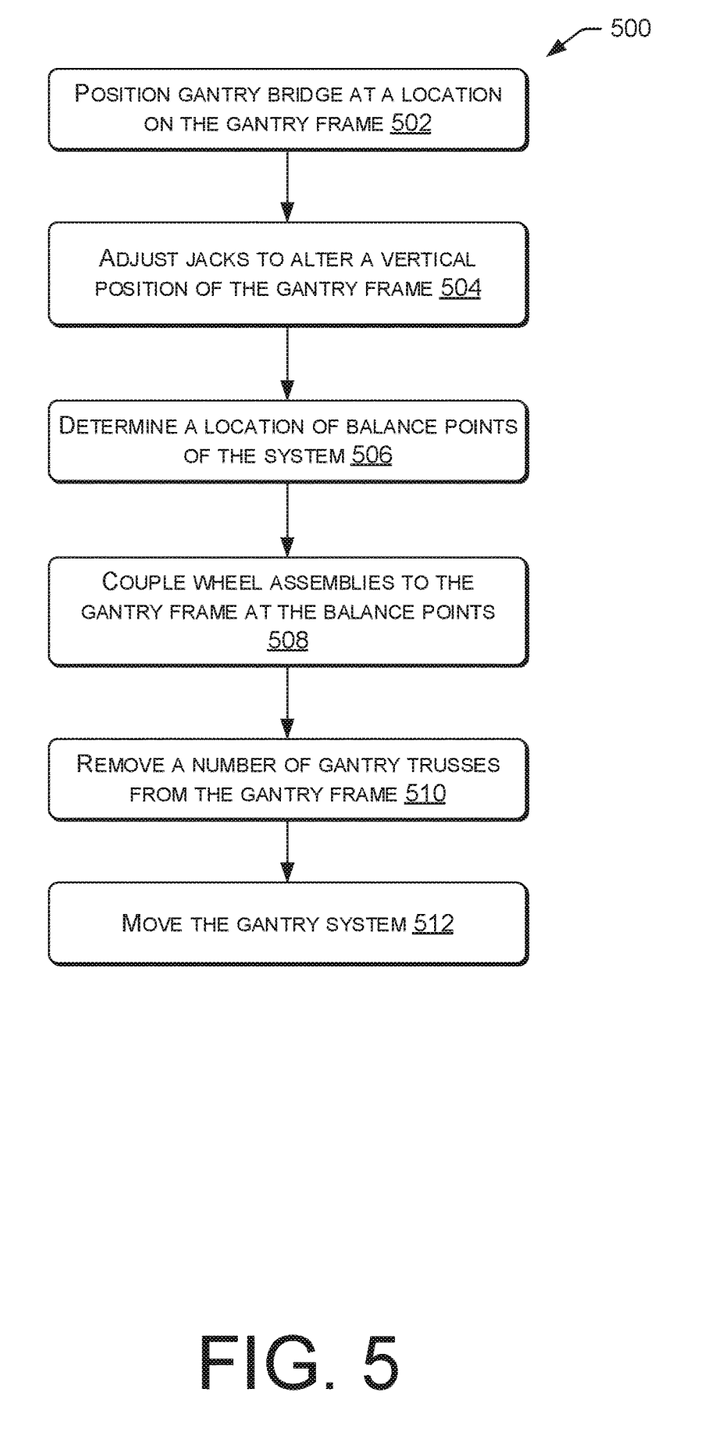
FIG. 5 is a flowchart illustrating a method of positioning a three-dimensional additive system using an example wheel assembly in accordance with an example of the present disclosure.

FIG. 5 is a flowchart illustrating a method 500 of positioning the system 100 using the wheel assemblies 144. The method 500 may be performed by one or more human users. However, at least a portion (e.g., step 506) of the method 500 may be executed and/or otherwise performed by the controller 138. The method 500 may include different and/or additional steps, and may be performed in a different order than described herein.

At 502, the method 500 includes positioning the gantry bridge 114 at a location on the gantry frame 116. In some examples, the controller 138 sends instructions to one or more motors 214 coupled to the carriage assemblies 134 and 136 that are configured to move the carriage assemblies 134 and 136 along the gantry frame 116. The instructions may cause the motors 214 to move the gantry bridge 114 such that the gantry bridge 114 is positioned proximate an end 154 of the gantry frame 116 prior to moving the system 100. By positioning the gantry bridge 114 proximate the end 154 of the gantry frame 116, the balance points 146(1) and 146(2) of the system 100 may be proximate the end 154 of the gantry frame 116 rather than the middle thereof. Moving the balance points 146(1) and 146(2) of the system 100 towards an end of the gantry frame 116 may reduce effort required to move (and/or turn) the system 100.

At 504, the method 500 includes adjusting one or more jacks 128 of the system 100 to alter a vertical position of the gantry frame 116 of the system. As mentioned previously, the jacks 128 include cranks 206 that, when rotated, adjust a vertical position of the wheel 204 of the jacks 128. Since the jacks 128 are attached to the gantry frame 116, adjusting a vertical position of the wheel 204 of the jacks 128 may also adjust a vertical position (or height) of the gantry frame 116.

At 506, the method 500 includes determining a location of the balance points 146(1) and 146(2) of the system 100. As mentioned previously, the location of the balance points 146(1) and 146(2) of the system 100 are defined by locations along the first length 120 and the second length 122 of the gantry frame 116 that are bisected by an axis 148. In some examples, the controller 138 may determine the balance points 146(1) and 146(2) of the system 100 based on a position of the gantry bridge 114 and/or by accessing known metrics and/or parameters of the system 100 stored in memory 140 of the controller 138. Furthermore, the location of the balance points 146(1) and 146(2) may be an approximate location (e.g., within a predetermined tolerance) of the balance points 146(1) and 146(2). Still further, human users may determine the location of the balance points 146(1) and 146(2) of the system 100 based at least in part on the position of the gantry bridge 114, dimensions of the gantry frame 116, or other parameters.

At 508, the method 500 includes coupling wheel assemblies 144 to the gantry frame 116 at the balance points 146(1) and 146(2) on the gantry frame 116. Securing the wheel assemblies 144 to the gantry frame 116 may include latching the securing portion 306 to a first frame member via the pin 310 and rotating the wheel assembly 144 such that a second frame member rests in the frame support 314. In some examples, at least two wheel assemblies 144 are attached to the gantry frame 116 at substantially similar locations on respective lengths of the gantry frame 116. In such an example, the system 100 may be moved by tipping the system 100 such that the system 100 is balanced on the wheel assemblies 144 and is movable thereon. Alternatively, more than two (e.g., four) wheel assemblies 144 may be attached to the system 100 and the system 100 may be rolled on the wheel assemblies 144.

At 510, the method 500 includes removing a number of gantry trusses 118 from the gantry frame 116. Step 510 may occur after a structure has been formed by an additive manufacturing process so as to allow the system 100 to be moved from around the structure without damaging the structure. For example, if the gantry frame 116 forms an enclosed frame, an end of the frame may be removed such that the system 100 is movable around the structure. As such, the system 100 may be moved when the gantry frame 116 forms a U-shaped frame, as shown in FIG. 1. Removing the number of gantry trusses 118 may include decoupling (e.g., removing bolts or other fasteners) gantry trusses 118 from one another.

At 512, the method 500 includes moving the gantry system 100. As mentioned previously, in examples where the system includes two wheel assemblies 144 attached to the gantry frame 116, the system is moved by tipping the system 100 such that the system 100 is balanced on the wheel assemblies 144 and is movable thereon. Alternatively, if four (or more) wheel assemblies 144 are attached to the gantry frame 116, the system 100 may be rolled without having to tip the system to balance the system on the wheel assemblies 144. In some examples, balancing the system 100 on the wheel assemblies 144 may be within ergonomic and safety requirements for a human user (or multiple human users) to complete. In such examples, one or more human users may easily move and steer the system 100 on the wheel assemblies 144.

INDUSTRIAL APPLICABILITY

The present disclosure provides an improved 3D additive manufacturing system configured to construct various types of structures, portions of structure(s), or other products utilizing additive manufacturing processes. The system described herein includes one or more wheel assemblies that are detachable from a gantry frame of the system. The wheel assemblies are positioned along the gantry frame at respective locations that allow one or more humans users to easily manipulate a position of the system. For instance, as noted above, an example system 100 includes a gantry frame assembly 116, a gantry bridge assembly 114, and a gantry carriage assembly 136 secured to a gantry truss 118 of the gantry frame assembly 116. The system 100 includes detachable wheel assemblies 144 that are attached to the gantry frame assembly 116 of the system 100. The detachable wheel assemblies 144 are disposed a location along the gantry frame assembly 116 that corresponds with a balance points 146(1) and 146(2) of the system 100.

Due to example configurations described herein, the system 100 is easily moveable by one or more human operators. For example, wheel assemblies 144 described herein are attached to a gantry truss 118 of the gantry frame 116 of the system 100 without requiring the use of tools to attach the wheel assemblies 144 to the gantry frame 116. Furthermore, the wheel assemblies 144 may be positioned along the gantry frame 116 at balance points 146(1) and 146(2) such that a weight of the system 100 is equal across an axis 148 that bisects the gantry frame 116. The wheel assemblies 144 and the location of the wheel assemblies 144 on the gantry frame 116 allow the system 100 to be easily moved around a construction site. Furthermore, by placing the wheel assemblies 144 at the respective balance points 146(1) and 146(2), the system 100 is able to be lifted and rolled by one or more users. For example, a force required to lift and roll the system 100 on the wheel assemblies 144 located at the balance points 146(1) and 146(2) may be within a limit for human ergonomics and/or safety requirements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An additive manufacturing system, comprising:
a gantry frame assembly including a gantry truss;
a gantry bridge assembly including a trolley movable along a lateral truss of the gantry bridge assembly;
a gantry carriage assembly movably secured to the gantry frame assembly and configured to support at least a portion of the gantry bridge assembly; and
a wheel assembly removably attachable to the gantry truss, the wheel assembly including:
an axle forming a first end of the wheel assembly;
a wheel rotatably attached to the axle;

a securing portion forming a second end of the wheel assembly, the securing portion including a pin configured to secure a first frame member of the gantry truss between the pin and a portion of the wheel assembly; and a frame support mating with a second frame member of the gantry truss such that the frame support supports the second frame member of the gantry truss when the wheel assembly is removably attached to the gantry truss.

2. The system of claim 1, wherein the frame support comprises a partial cylinder having an opening facing the securing portion of the wheel assembly.

3. The system of claim 1, wherein the portion of the wheel assembly includes a lateral member extending between the securing portion and the frame support, the lateral member configured to support at least a portion of the gantry truss.

4. The system of claim 1, wherein the securing portion includes a vertical tab with an aperture through which the pin is insertable.

5. The system of claim 1, further comprising one or more jacks attached to the gantry frame assembly and configured to raise at least a portion of the gantry frame assembly such that the wheel assembly is attachable to a bottom portion of the gantry truss.

6. The system of claim 1, wherein the pin includes a spring-loaded pin.

7. The system of claim 1, wherein the securing portion and the frame support are offset vertically from the axle such that the securing portion and the frame support are located below the axle vertically.

8. The system of claim 1, wherein the gantry frame assembly is raised by adjusting one or more jacks prior to attaching the wheel assembly to the gantry frame assembly.

9. The system of claim 1, wherein the wheel assembly is coupled to the gantry frame assembly at a location that corresponds with a balance point of the system, wherein the balance point is defined by an axis that bisects the gantry frame assembly such that a weight of the system is equal on either side of the axis.

* * * * *